(12) United States Patent
Zhang et al.

(10) Patent No.: US 12,307,993 B2
(45) Date of Patent: May 20, 2025

(54) OVERDRIVE DEVICE AND METHOD

(71) Applicants: Haining ESWIN IC Design Co., Ltd., Zhejiang (CN); Beijing ESWIN Computing Technology Co., Ltd., Beijing (CN)

(72) Inventors: Duoduo Zhang, Zhejiang (CN); Hongyang Ge, Zhejiang (CN)

(73) Assignees: Haining ESWIN IC Design Co., Ltd., Haining (CN); Beijing ESWIN Computing Technology Co., Ltd, Beijing (CN)

( * ) Notice: Subject to any disclaimer, the term of this patent is extended or adjusted under 35 U.S.C. 154(b) by 0 days.

(21) Appl. No.: 18/147,550

(22) Filed: Dec. 28, 2022

(65) Prior Publication Data

US 2023/0162696 A1 May 25, 2023

(30) Foreign Application Priority Data

Aug. 29, 2022 (CN) .......................... 202211040094.6

(51) Int. Cl.
*G06V 10/50* (2022.01)
*G06V 10/75* (2022.01)
*G09G 3/36* (2006.01)

(52) U.S. Cl.
CPC ............. *G09G 3/36* (2013.01); *G06V 10/507* (2022.01); *G06V 10/751* (2022.01); *G09G 2320/0252* (2013.01)

(58) Field of Classification Search
None
See application file for complete search history.

(56) References Cited

U.S. PATENT DOCUMENTS

| 2019/0122636 A1* | 4/2019 | Tang ........................ G09G 5/10 |
| 2019/0189082 A1* | 6/2019 | Shehata ................. G09G 5/026 |
| 2022/0383805 A1* | 12/2022 | Lee ....................... G09G 3/3233 |

FOREIGN PATENT DOCUMENTS

| CN | 201410260570.4 | 1/2016 |
| CN | 201710800743.0 | 6/2018 |

* cited by examiner

*Primary Examiner* — Parul H Gupta

(57) ABSTRACT

The present application discloses an overdrive device and method, and relates to the field of display control technology. The overdrive device comprises: a first determination module for determining a basic overdrive value of a target pixel unit according to a basic overdrive lookup table and a first gray scale value and a second gray scale value of the target pixel unit, wherein the basic overdrive lookup table is a set of data pre-stored in a storage module for determining the basic overdrive value, the first gray scale value is a display gray scale value of a current frame of the target pixel unit, and the second gray scale value is a display gray scale value of a previous frame of the target pixel unit; a second determination module for determining an overdrive gain value corresponding to a target refresh frequency, wherein the target refresh frequency is a current refresh frequency of a display apparatus where a target pixel unit is located; and a processing module for obtaining an actual overdrive value required for performing an overdrive operation on the target pixel unit according to the basic overdrive value, the overdrive gain value, the first gray scale value and the second gray scale value.

13 Claims, 2 Drawing Sheets

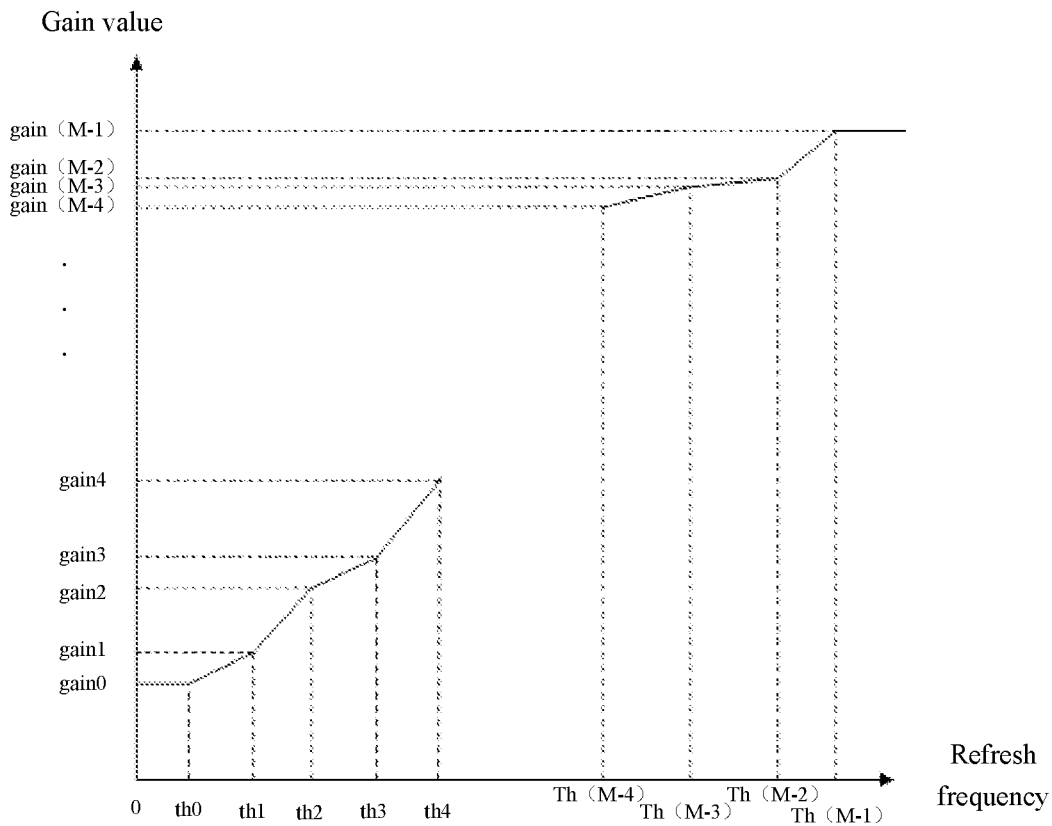

FIG. 3 determining a basic overdrive value of a target pixel unit according to a basic overdrive lookup table and a first gray scale value and a second gray scale value of the target pixel unit, wherein the basic overdrive lookup table is a set of data pre-stored in a storage module for determining the basic overdrive value, the first gray scale value is a display gray scale value of a current frame of the target pixel unit, and the second gray scale value is a display gray scale value of a previous frame of the target pixel unit — Step 401 determining an overdrive gain value corresponding to a target refresh frequency, wherein the target refresh frequency is a current refresh frequency of a display apparatus where a target pixel unit is located — Step 402 obtaining an actual overdrive value required for performing an overdrive operation on the target pixel unit according to the basic overdrive value, the overdrive gain value, the first gray scale value and the second gray scale value — Step 403

FIG. 4

OVERDRIVE DEVICE AND METHOD

This application claims priority to Chinese Patent Application No.CN2022110400946, titled "OVERDRIVE DEVICE AND METHOD" and filed to the State Patent Intellectual Property Office on the entire contents of which are incorporated herein by reference.

TECHNICAL FIELD

The present application relates to the field of display control technology, in particular to an overdrive device and method.

BACKGROUND ART

Since the liquid crystal molecules have a viscous property, it takes a period of time for the liquid crystal molecules to deflect to a desired posture under a voltage drive, and if the period of time is too long, the liquid crystal display panel may appear a blurred outline or a smear phenomenon, which affects the display quality of the liquid crystal display panel. In order to reduce the time required for the liquid crystal molecules to deflect to the desired attitude, an overdrive (OD) technique is applied to the driving of the liquid crystal to accelerate the rotation of the liquid crystal molecules according to the OD technique, thereby reducing the time taken for the liquid crystal molecules to deflect to the desired attitude and reducing the probability of the liquid crystal display panel blurring or smearing, thereby improving the display quality.

The overdrive technology mainly uses an overdrive lookup table (OD LUT) to determine an overdrive value of a pixel unit of a liquid crystal display panel, and changes a voltage applied to a liquid crystal molecule according to the determined overdrive value to realize the acceleration rotation of the liquid crystal molecule.

At present, there are typically two overdrive technologies: one is to store an overdrive lookup table corresponding to a specified refresh frequency, the only overdrive lookup table being used to determine an overdrive value regardless of the refresh frequency employed by the display apparatus. Although this method can reduce the storage space required for storing the overdrive lookup table, the determined overdrive value cannot be adaptively changed with the refresh frequency, thus resulting in poor display quality of the liquid crystal display panel. Alternatively, a plurality of overdrive lookup tables are stored, with each overdrive lookup table having its corresponding refresh frequency. In this way, although there are a plurality of overdrive lookup tables corresponding to the refresh frequency, when the number of overdrive lookup tables is small, in the case where the refresh frequency is not in the refresh frequency involved in the overdrive lookup table, the obtained overdrive value is still inaccurate, and the expected overdrive effect cannot be achieved. When the number of the overdrive lookup tables is large, although a relatively accurate overdrive value can be obtained, a large storage space is consumed, and a large amount of operation resources are consumed in determining the overdrive value.

SUMMARY OF THE INVENTION

In view of this, the present application proposes an overdrive device and method to determine an overdrive value more suitable for a current refresh frequency while reducing the storage space occupied by an overdrive lookup table required for overdrive.

In order to achieve the above-mentioned object, the present application mainly provides the following technical solutions:

in a first aspect, the present application provides an overdrive device including:

a first determination module for determining a basic overdrive value of a target pixel unit according to a basic overdrive lookup table and a first gray scale value and a second gray scale value of the target pixel unit, wherein the basic overdrive lookup table is a set of data pre-stored in a storage module for determining the basic overdrive value, the first gray scale value is a display gray scale value of a current frame of the target pixel unit, and the second gray scale value is a display gray scale value of a previous frame of the target pixel unit;

a second determination module for determining an overdrive gain value corresponding to a target refresh frequency, wherein the target refresh frequency is a current refresh frequency of a display apparatus where a target pixel unit is located; and a processing module for obtaining an actual overdrive value required for performing an overdrive operation on the target pixel unit according to the basic overdrive value, the overdrive gain value, the first gray scale value and the second gray scale value.

In some embodiments, the processing module includes: a first processing unit for determining a target overdrive value required by the target pixel unit at the target refresh frequency according to the basic overdrive value and the overdrive gain value; and a second processing unit for determining the actual overdrive value according to the target overdrive value, the first gray scale value and the second gray scale value.

In some embodiments, the second processing module is specifically used for determining the sum of the first gray scale value and the target overdrive value as the actual overdrive value when the first gray scale value is greater than the second gray scale value; when the first gray scale value is less than the second gray scale value, a difference value between the first gray scale value and the target overdrive value is determined as the actual overdrive value; the first gray scale value is determined as the actual overdrive value when the first gray scale value is equal to the second gray scale value.

In some embodiments, the basic overdrive lookup table is set by: setting a first refresh frequency and a plurality of gray scale value sets, wherein a gray scale value set is composed of a third gray scale value and a fourth gray scale value; determining an overdrive value corresponding to each gray scale value set at the first refresh frequency according to the first refresh frequency and a third gray scale value and a fourth gray scale value included by each gray scale value set; and setting the basic overdrive lookup table according to an overdrive value corresponding to each of the gray scale value sets.

In some embodiments, the second determination module is specifically used for determining an overdrive gain value corresponding to the target refresh frequency according to a corresponding relationship between a refresh frequency and a gain value recorded in a gain value lookup table. In some embodiments, the gain value lookup table is set by: determining a plurality of overdrive lookup tables, wherein each overdrive lookup table has its own corresponding second refresh frequency; for each of the second refresh frequencies: calculating an average value of overdrive values included in an overdrive lookup table corresponding to the second refresh frequency; determining a ratio between the calculated average value and the average value of the overdrive values included in the basic overdrive lookup table as a gain value corresponding to the second refresh frequency; and setting the gain value lookup table according to the gain value corresponding to each of the second refresh frequencies.

In some embodiments, the first determination module includes: a first determination unit for determining an overdrive value corresponding to the first gray scale value and the second gray scale value in the basic overdrive lookup table as the basic overdrive value in the case where a third gray scale value corresponding to the first gray scale value and a fourth gray scale value corresponding to the second gray scale value exist in the basic overdrive lookup table; wherein the basic overdrive lookup table includes a plurality of overdrive values, and each overdrive value has a third gray scale value and a fourth gray scale value respectively corresponding thereto.

In some embodiments, the first determination module includes: a second determination unit for: when at least one of the following is present: no third gray scale value exists in the basic overdrive lookup table which is the same as the first gray scale value, and no fourth gray scale value exists in the basic overdrive lookup table which is the same as the second gray scale value; selecting two third gray scale values adjacent to the numerical value and two fourth gray scale values adjacent to the numerical value in the basic overdrive lookup table; determining four overdrive values according to the selected two third gray scale values and the selected two fourth gray scale values, and performing bilinear interpolation processing on the determined four overdrive values to obtain the basic overdrive value; wherein the first gray scale value is included in a numerical interval composed of the determined two third gray scale values, and the second gray scale value is included in a numerical interval composed of the determined two fourth gray scale values; the basic overdrive lookup table includes a plurality of overdrive values, and each overdrive value has a third gray scale value and a fourth gray scale value respectively corresponding thereto.

In some embodiments, the second determination module includes: a third determination unit for determining a gain value corresponding to the target refresh frequency in the gain value lookup table as an overdrive gain value of the target refresh frequency in the case where a refresh frequency corresponding to the target refresh frequency exists in the gain value lookup table.

In some embodiments, the second determination module includes: a fourth determination unit for selecting two refresh frequencies adjacent to a numerical value in the gain value lookup table in the case where no refresh frequency corresponding to the target refresh frequency exists in the gain value lookup table, and the target refresh frequency is included in a refresh frequency range defined by the gain value lookup table, determining two gain values according to the selected two refresh frequencies, and performing linear interpolation processing on the determined two gain values to obtain an overdrive gain value of the target refresh frequency; wherein the target refresh frequency is included in a numerical interval composed of two adjacent refresh frequencies.

In some embodiments, the second determination module includes: a fifth determination unit for determining a gain value corresponding to the minimum refresh frequency in the gain value lookup table as an overdrive gain value of the target refresh frequency in the case where the target refresh frequency is less than the minimum refresh frequency in the gain value lookup table; and in the case where the target refresh frequency is greater than a maximum refresh frequency in the gain value lookup table, determining a gain value corresponding to the maximum refresh frequency in the gain value lookup table as an overdrive gain value of the target refresh frequency.

In a second aspect, the present application provides an overdrive method including:
  determining a basic overdrive value of a target pixel unit according to a basic overdrive lookup table and a first gray scale value and a second gray scale value of the target pixel unit, wherein the basic overdrive lookup table is a set of data pre-stored in a storage module for determining the basic overdrive value, the first gray scale value is a display gray scale value of a current frame of the target pixel unit, and the second gray scale value is a display gray scale value of a previous frame of the target pixel unit;
  determining an overdrive gain value corresponding to a target refresh frequency, wherein the target refresh frequency is a current refresh frequency of a display apparatus where a target pixel unit is located; and
  obtaining an actual overdrive value required for performing an overdrive operation on the target pixel unit according to the basic overdrive value, the overdrive gain value, the first gray scale value and the second gray scale value.

In a third aspect, the present application provides a controller including a processor and a machine-readable storage medium storing machine-executable instructions capable of being executed by the processor, the instructions being loaded and executed by the processor to achieve the overdrive method according to the second aspect.

In a fourth aspect, the present application provides a display apparatus including: the overdrive device of the first aspect.

With the above-mentioned technical solution, according to the overdrive device and method provided in the present application, firstly, a basic overdrive value of a target pixel unit is determined according to a basic overdrive lookup table and a first gray scale value and a second gray scale value of the target pixel unit when an overdrive operation of the target pixel unit is required. Then the current refresh frequency of the display apparatus where the target pixel unit is located is taken as the target refresh frequency, and the second determination module determines an overdrive gain value corresponding to the target refresh frequency. Finally, the processing module processes the basic overdrive value, the overdrive gain value, the first gray scale value and the second gray scale value to obtain the actual overdrive value required for the overdrive operation on the target pixel unit. It can be seen that when performing overdrive, the solution provided in the present application only needs a set of basic overdrive lookup tables to be completed, and therefore the storage space occupied by the overdrive lookup table can be reduced, so that the size of the memory storing the overdrive lookup table can be reduced, and then the chip area for deploying the memory can be reduced, the chip manufacturing cost can be reduced, and the market competitiveness of the chip can be improved. In addition, after determining the basic overdrive value, it is corrected using the overdrive gain value corresponding to the current refresh frequency, thereby determining an overdrive value more suitable for the current refresh frequency.

Therefore, the present application can determine an overdrive value more suitable for the current refresh frequency while reducing the storage space occupied by an overdrive lookup table required for overdrive, thereby improving the display quality of a display apparatus.

The above description is merely an overview of the technical solution of the present application, which can be implemented according to the contents of the description in order to enable the technical means of the present application to be more clearly understood, and in order to enable the above and other objects, features, and advantages of the present application to be more clearly understood, embodiments of the present application are set forth below.

BRIEF DESCRIPTION OF THE DRAWINGS

In order to explain the embodiments of the present application or the technical solutions in the prior art more clearly, the following will briefly introduce the drawings which need to be used in the embodiments or the description of the prior art; obviously, the drawings in the following description are some embodiments of the present application, and it would have been obvious for a person of ordinary skill in the art to obtain other drawings according to these drawings without involving any inventive effort.

FIG. 3 is a schematic view showing a correspondence between a refresh frequency and a gain value according to an embodiment of the present application;

FIG. 4 is a flowchart showing an overdrive method according to an embodiment of the present application.

DETAILED DESCRIPTION OF THE INVENTION

Figure 1:
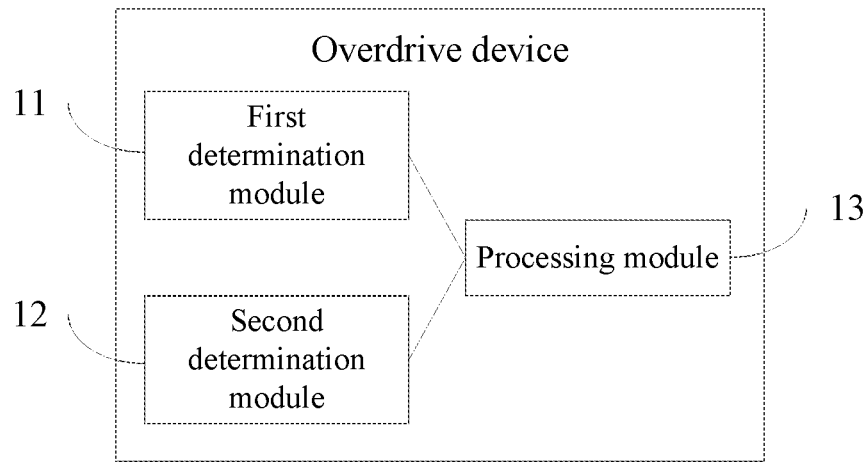
FIG. 1 is a schematic view showing a structure of an overdrive device according to an embodiment of the present application.

Exemplary embodiments of the present disclosure will be described in more detail below with reference to the accompanying drawings. While the drawings show exemplary embodiments of the present disclosure, the present disclosure may be embodied in various forms and should not be construed as limited to the embodiments set forth herein. Rather, these embodiments are provided so that this disclosure will be thorough and complete, and will fully convey the scope of the disclosure to a person skilled in the art.

The overdrive technology mainly uses an overdrive lookup table to determine an overdrive value of a pixel unit of a liquid crystal display panel, and changes a voltage applied to a liquid crystal molecule according to the determined overdrive value to realize the acceleration rotation of the liquid crystal molecule.

At present, there are typically two overdrive technologies: one is to store an overdrive lookup table corresponding to a specified refresh frequency, the only overdrive lookup table being used to determine an overdrive value regardless of the refresh frequency employed by the display apparatus. Although this method can reduce the storage space required for storing the overdrive lookup table, the determined overdrive value cannot be adaptively changed with the refresh frequency, thus resulting in poor display quality of the liquid crystal display panel. Alternatively, a plurality of overdrive lookup tables is stored, with each overdrive lookup table having its corresponding refresh frequency. In this way, although there are a plurality of overdrive lookup tables corresponding to the refresh frequency, when the number of overdrive lookup tables is small, in the case where the refresh frequency is not in the refresh frequency involved in the overdrive lookup table, the obtained overdrive value is still inaccurate, and the expected overdrive effect cannot be achieved. When the number of the overdrive lookup tables is large, although a relatively accurate overdrive value can be obtained, a large storage space is consumed, and a large amount of operation resources are consumed in determining the overdrive value.

To overcome the deficiencies of the overdrive techniques described above, embodiments of the present application provide an overdrive device and method. The overdrive device and method according to the embodiments of the present application can be applied to any display apparatus requiring overdrive, in particular to a driver chip of the display apparatus. The present embodiment does not specifically limit the specific type of display apparatus. Illustratively, the display apparatus may include, but are not limited to, cell phones, televisions, tablets, and the like.

The overdrive device and method according to the embodiments of the present application can determine an overdrive value more suitable for a current refresh frequency while reducing the storage space occupied by an overdrive lookup table required for overdrive, so that the display quality of a display apparatus can be improved.

Hereinafter, an overdrive device and method according to the embodiments of the present application will be described in detail.

As shown in FIG. 1, the embodiment of the present application provides an overdrive device mainly including a first determination module 11, a second determination module 12, and a processing module 13.

A first determination module 11 for determining a basic overdrive value of a target pixel unit according to a basic overdrive lookup table and a first gray scale value and a second gray scale value of the target pixel unit, wherein the basic overdrive lookup table is a set of data pre-stored in a storage module for determining the basic overdrive value, the first gray scale value is a display gray scale value of a current frame of the target pixel unit, and the second gray scale value is a display gray scale value of a previous frame of the target pixel unit;

A second determination module 12 for determining an overdrive gain value corresponding to a target refresh frequency, wherein the target refresh frequency is a current refresh frequency of a display apparatus where a target pixel unit is located.

A processing module 13 for obtaining an actual overdrive value required for performing an overdrive operation on the target pixel unit according to the basic overdrive value, the overdrive gain value, the first gray scale value and the second gray scale value.

The specific structure and interaction relationship of each component involved in the overdrive device are described in detail as follows:

A First Determination Module 11 the first determination module 11 is mainly used for determining a basic overdrive value of the target pixel unit. The target pixel unit is a pixel unit requiring an overdrive operation in the display apparatus.

In practical applications, the overdrive lookup table is stored in a static random-access memory (SRAM), and the more data in the overdrive lookup table or the more the number of the overdrive lookup table, the more storage space occupied by the overdrive lookup table. To store an overdrive lookup table, an area of static random-access memory tends to increase, resulting in increased hardware costs. Therefore, in order to reduce the storage space occupied by an overdrive lookup table, the embodiment of the present application uses only one overdrive lookup table, i.e., a basic overdrive lookup table. The basic overdrive lookup table is a set of data pre-stored in the storage module for determining a basic overdrive value. Modules capable of storing the basic overdrive lookup table may be used as storage modules, illustratively static random-access memories as described above. The basic overdrive lookup table includes a plurality of overdrive values, and each overdrive value has a third gray scale value and a fourth gray scale value respectively corresponding thereto. Here, the third gray scale value is the display gray scale value of the current frame, and the fourth gray scale value is the display gray scale value of the previous frame. Illustratively, as shown in Table-1, Table-1 shows a basic overdrive lookup table. Included in Table-1 are third gray scale values "V0 to VN", fourth gray scale values "V0 to VN", and overdrive values "d_00 to d_NN".

TABLE-1

| Fourth gray scale value<br>Overdrive<br>Dynamic<br>value<br>Third<br>Gray scale<br>value | V0 | V1 | ... | VN |
|---|---|---|---|---|
| V0 | d_00 | d_01 | ... | d_0N |
| V1 | d_10 | d_11 | ... | d_1N |
| V2 | d_20 | d_21 | ... | d_2N |
| ... | ... | ... | ... | ... |
| VN | d_N0 | d_N1 | ... | d_NN |

Regardless of the value of the current refresh frequency of the display apparatus in which the target pixel unit is located, a basic overdrive value may be determined for the target pixel unit through a basic overdrive lookup table. The basic overdrive value is a data base for subsequently determining the actual overdrive value of the target pixel unit.

When the first determination module 11 determines the basic overdrive gray scale value for the target pixel unit, in addition to using the basic overdrive lookup table, it also needs to use the display gray scale value of the current frame and the display gray scale value of the previous frame of the target pixel unit. The display gray scale value of the current frame and the display gray scale value of the previous frame of the target pixel unit may be obtained from the image data of the target pixel unit. The image data of the target pixel unit exists in the dynamic random-access memory. In addition, the image data of the target pixel unit is composed of data of the RGB three channels, so that the display gray scale value of the current frame and the display gray scale value of the previous frame of the target pixel unit are related to the currently selected channel. For example, when currently being overdriven for the R channel, the display gray scale value of the current frame of the target pixel unit and the display gray scale value of the previous frame are both the gray scale values corresponding to the R channel.

Figure 2:
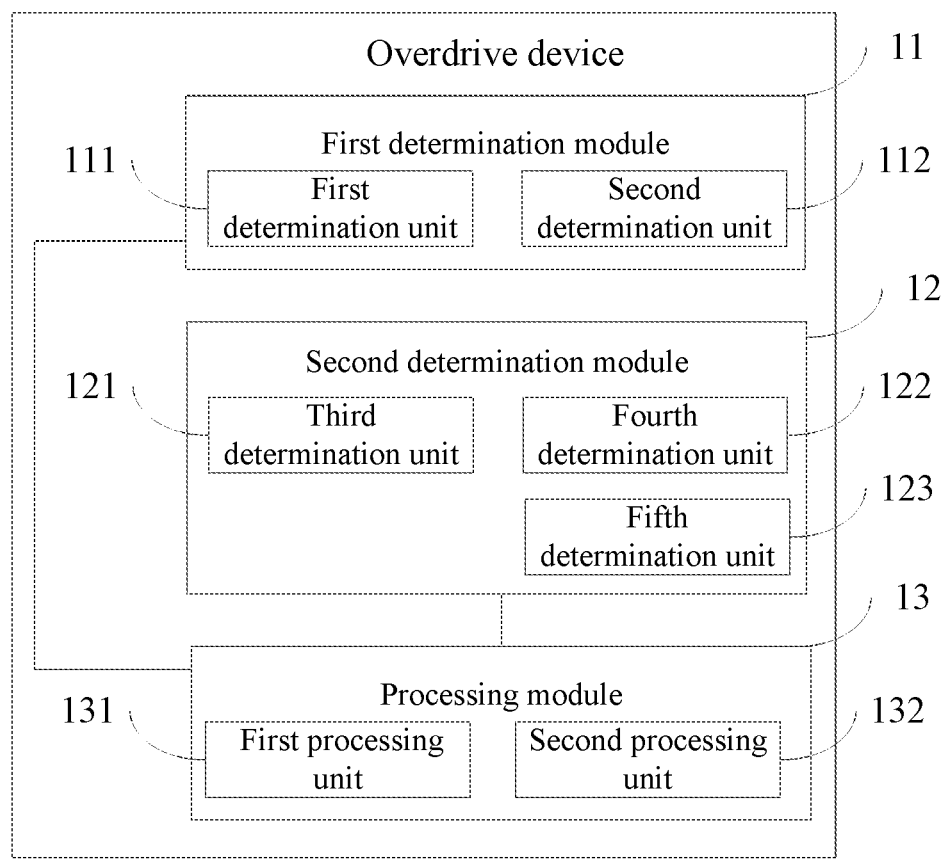
FIG. 2 is a schematic view showing a configuration of an overdrive device according to another embodiment of the present application.

In the following, the display gray scale value of the current frame of the target pixel unit is defined as a first gray scale value, and the display gray scale value of the previous frame of the target pixel unit is defined as a second gray scale value, and the scheme for determining the basic overdrive gray scale value is described:

first, as shown in FIG. 2, the first determination module 11 includes a first determination unit 111.

A first determination unit 111 for determining an overdrive value corresponding to the first gray scale value and the second gray scale value in the basic overdrive lookup table as the basic overdrive value in the case where a third gray scale value corresponding to the first gray scale value exists in the basic overdrive lookup table and a fourth gray scale value corresponding to the second gray scale value exists in the basic overdrive lookup table.

When there is a third gray scale value which is the same as the first gray scale value and there is a fourth gray scale value which is the same as the second gray scale value in the basic overdrive lookup table, an overdrive value corresponding to the first gray scale value and the second gray scale value in the basic overdrive lookup table is directly determined as the basic overdrive value of the target pixel unit without calculation.

Illustratively, basic overdrive lookup table is as shown in Table-1. The target pixel unit has a first gray scale value V1 and a second gray scale value V0. There is a third gray scale value V1 which is the same as the first gray scale value V1 in Table-1, and there is a fourth gray scale value V0 which is the same as the second gray scale value V0, and therefore an overdrive value d_10 corresponding to the third gray scale value V1 and the fourth gray scale value V0 in Table-1 is determined as a basic overdrive value of the target pixel unit.

Second, as shown in FIG. 2, the first determination module 11 includes a second determination unit 112. A second determination unit 112 for: when at least one of the following is present: no third gray scale value exists in the basic overdrive lookup table which is the same as the first gray scale value, and no fourth gray scale value exists in the basic overdrive lookup table which is the same as the second gray scale value; selecting two third gray scale values adjacent to the numerical value and two fourth gray scale values adjacent to the numerical value in the basic overdrive lookup table; determining four overdrive values according to the selected two third gray scale values and the selected two fourth gray scale values, and performing bilinear interpolation processing on the determined four overdrive values to obtain the basic overdrive value; wherein the first gray scale value is included in a numerical interval composed of the determined two third gray scale values, and the second gray scale value is included in a numerical interval composed of the determined two fourth gray scale values.

In practical applications, the more data in the basic overdrive lookup table, the more storage space used for storing the basic overdrive lookup table, and the more area of the static random-access memory will be increased; therefore, in order to reduce the data volume in the basic overdrive lookup table, the gray scale value range [0, 255] is equally divided into N+1 segments by N grey scale thresholds, and the N grey scale thresholds are respectively used as a third gray scale value and a fourth gray scale value.

Since the number of the third gray scale value and the fourth gray scale value included in the basic overdrive lookup table is limited, when determining the basic overdrive value for the target pixel unit, at least one of the following usually occurs: no third gray scale value exists in the basic overdrive lookup table which is the same as the first gray scale value, and no fourth gray scale value exists in the basic overdrive lookup table which is the same as the second gray scale value; therefore, in order to still be able to determine the basic overdrive value for the target pixel unit in the above-mentioned case, a second determination unit 112 is provided in the first determination module 11.

Illustratively, a basic overdrive lookup table is as shown in Table-1. The first gray scale value of the target pixel unit is P1, and the second gray scale value thereof is P2. As can be seen, there is no third gray scale value in Table-1 that is the same as the first gray scale value P1, and there is also no fourth gray scale value that is the same as the second gray scale value P2. Therefore, two third gray scale values "V0 and V1" adjacent to the values in Table-1 are selected, and the first gray scale value P1 is included in the numerical range [V0, V1] composed of the determined two third gray scale values "V0 and V1". Two fourth gray scale values "V0 and V1" adjacent to the values in Table-1 are selected, the second gray scale value P2 is included in the determined numerical interval [V0, V1] composed of the two fourth gray scale values "V0 and V1". Four overdrive values are determined according to the selected two third gray scale values and the selected two fourth gray scale values, and the four overdrive values are respectively: an overdrive value d_00 corresponding to the third gray scale value V0 and the fourth gray scale value V0, an overdrive value d_01 corresponding to the third gray scale value V0 and the fourth gray scale value V1, an overdrive value d_10 corresponding to the third gray scale value V1 and the fourth gray scale value V0, and an overdrive value d_11 corresponding to the third gray scale value V1 and the fourth gray scale value V1. Bilinear interpolation processing is performed on the determined above-mentioned four overdrive values to obtain a basic overdrive value corresponding to a target pixel unit.

Note that, in the case where there is no third gray scale value corresponding to the first gray scale value but there is a fourth gray scale value corresponding to the second gray scale value in the basic overdrive lookup table: two third gray scale values adjacent to the numerical value in the basic overdrive lookup table are selected, and the first gray scale value is included in a numerical value interval composed of the determined two third gray scale values; two fourth gray scale values adjacent to the numerical value in the basic overdrive lookup table are selected, wherein the second gray scale value is included in a numerical value interval composed of the determined two fourth gray scale values, and the fourth gray scale value being the lower limit value of the data interval is the same as the second gray scale value.

Note that, in the case where a third gray scale value corresponding to the first gray scale value exists in the basic overdrive lookup table, but a fourth gray scale value corresponding to the second gray scale value does not exist: two third gray scale values adjacent to the numerical value in the basic overdrive lookup table are selected, wherein the first gray scale value is included in a numerical value interval composed of the determined two third gray scale values, and the third gray scale value of the lower limit value of the data interval is the same as the first gray scale value; two fourth gray scale values adjacent to the value in the basic overdrive lookup table are selected, and the second gray scale value is included in a numerical interval composed of the determined two fourth gray scale values.

A Second Determination Module 12 the second determination module 12 is mainly used to determine the required overdrive gain value at the current refresh frequency. The overdrive gain value is used to correct the basic overdrive value to obtain an overdrive value suitable for the current refresh frequency.

The current refresh frequency of the display apparatus in which the target pixel unit is located is defined as the target refresh frequency. Since the basic overdrive lookup table does not define the refresh frequency, the target pixel unit can determine the basic overdrive value through the basic overdrive lookup table at any refresh frequency. Therefore, the determined basic overdrive value has poor applicability to the target refresh frequency. In order to determine an overdrive value more suitable for the target refresh frequency, the second determination module 12 is required to determine an overdrive gain value corresponding to the target refresh frequency to correct the basic overdrive value using the determined overdrive gain value.

The second determination module 12, when determining the overdrive gain value, proceeds according to the gain value lookup table. The second determination module 12 is specifically used for determining an overdrive gain value corresponding to the target refresh frequency according to a corresponding relationship between a refresh frequency and a gain value recorded in a gain value lookup table. A plurality of refresh frequencies and gain values corresponding to each refresh frequency are recorded in the gain value lookup. Illustratively, as shown in Table-2, the gain values "gain0 to gain (M-1)" and the refresh frequencies "th0 to th (M-1)" are included in Table-2.

TABLE 2

| Refresh frequency | th0 | th1 | . . . | th(M − 1) |
| Gain value | gain0 | gain1 | . . . | gain(M − 1) |

The process of the second determination module 12 determining the overdrive gain value of the target refresh frequency is described below:

First, as shown in FIG. 2, the second determination module 12 includes a third determination unit 121. The third determination unit 121 is used for acquiring the overdrive gain value corresponding to the target refresh frequency in the gain value lookup table as the overdrive gain value of the target refresh frequency in the case where there is the same refresh frequency as the target refresh frequency in the gain value lookup table.

When there is a refresh frequency which is the same as the target refresh frequency in the gain value lookup table, the gain value corresponding to the target refresh frequency in the gain value lookup table is directly acquired as the overdrive gain value of the target refresh frequency without calculation.

Illustratively, a gain value lookup table is as shown in Table-2. The target refresh frequency is th1. There is the same refresh frequency as the target refresh frequency th1 in Table-2, and therefore the gain value gain1 corresponding to th1 in Table-2 is determined as the overdrive gain value of the target refresh frequency.

Second, as shown in FIG. 2, the second determination module 12 includes a fourth determination unit 122. A fourth determination unit 122 for selecting two refresh frequencies adjacent to a numerical value in the gain value lookup table in the case where no refresh frequency corresponding to the target refresh frequency exists in the gain value lookup table, and the target refresh frequency is included in a refresh frequency range defined by the gain value lookup table, determining two gain values according to the selected two refresh frequencies, and performing linear interpolation processing on the determined two gain values to obtain an overdrive gain value of the target refresh frequency; wherein the target refresh frequency is included in a numerical interval composed of two adjacent refresh frequencies.

When the overdrive operation is performed in the embodiment of the present application, a gain value lookup table is added with respect to the existing overdrive operation. The more data in the gain value lookup table, the more storage space is used for storing the gain value lookup table, and the area of the static random-access memory will be increased; therefore, considering the existence of the gain value lookup table will also increase the storage space; therefore, in order to reduce the data volume of the gain value lookup table, the display apparatus refresh frequency range [FL, FH] is divided into M+1 segments by M frequency threshold values, the M frequency threshold values are determined as the refresh frequencies in the gain value lookup table, and a corresponding gain value is set for each refresh frequency. Fl represents the lowest refresh frequency of the display apparatus and FH represents the highest refresh frequency of the display apparatus. By recording only the set frequency threshold value and the gain value corresponding to the frequency threshold value in the gain value lookup table as described above, the data volume of the gain value lookup table is reasonably reduced, thereby reducing the storage space occupied by the gain value lookup table. In addition, the gain lookup table can provide an overdrive gain value that corrects the basic overdrive value to determine an overdrive value that is more appropriate for the current refresh frequency. Therefore, the presence of the gain value lookup table can improve the display quality of the display apparatus on the premise of reducing the storage space occupied by the overdrive lookup table required for overdrive.

Since the number of refresh frequencies included in the gain value lookup table is limited, when determining the overdrive gain value for the target refresh frequency, it would usually occur that there is no refresh frequency in the gain value lookup table which is the same as the target refresh frequency, and the target refresh frequency is included in the refresh frequency range defined by the gain value lookup table; therefore, in order to still be able to determine the overdrive gain value for the target refresh frequency in the above-mentioned situation, a fourth determination unit 122 is provided in the second determination module 12.

Illustratively, a gain value lookup table is as shown in Table-2. The target refresh frequency corresponding to the target pixel unit is f. As can be seen, the same refresh frequency as the target refresh frequency f does not exist in Table-2. Therefore, two refresh frequencies "th0 and th1" adjacent to the values in Table-2 are selected, and the target refresh frequency f is included in the determined numerical interval th0, th1 composed of the two refresh frequencies "th0 and th1". Two gain values are determined according to the selected two refresh frequencies, wherein the two gain values are respectively: the gain0 corresponding to the refresh frequency "th0" and the gain1 corresponding to the refresh frequency "th1" are refreshed. Linear interpolation processing is performed on the determined above-mentioned two gain values to obtain an overdrive gain value corresponding to a target refresh frequency.

Thirdly, as shown in FIG. 2, the second determination module 12 includes a fifth determination unit 123. A fifth determination unit 123 for determining a gain value corresponding to the minimum refresh frequency in the gain value lookup table as an overdrive gain value of the target refresh frequency in the case where the target refresh frequency is less than the minimum refresh frequency in the gain value lookup table; and in the case where the target refresh frequency is greater than a maximum refresh frequency in the gain value lookup table, determining a gain value corresponding to the maximum refresh frequency in the gain value lookup table as an overdrive gain value of the target refresh frequency.

The above scheme of determining the overdrive gain value of the target refresh frequency can be summarized as follows:

when f<th0, ODgain=gain0;

when f>th (M-1), ODgain=gain (M-1);

when th0<f<th (M-1), the overdrive gain value of the target refresh frequency is determined by:

$$ODgain = \frac{(th(i+1-f) \times \text{gain}(i) + (f - th(i)) \times \text{gain}(i+1)}{th(i+1) - th(i)}$$

wherein f represents a target refresh frequency; th0 represents the minimum refresh frequency in the gain value lookup table; th (M-1) represents the maximum refresh frequency in the gain value lookup table; ODgain represents an overdrive gain value of a target refresh frequency; th(i) represents a refresh frequency with a small numerical value from two refresh frequencies adjacent to a numerical value selected from a gain value lookup table; th(i+1) represents a refresh frequency with a large numerical value from two refresh frequencies adjacent to a numerical value selected from a gain value lookup table; the target refresh frequency f is included in the determined numerical interval [th(i), th(i+1)] of the two refresh frequencies "th(i) and th(i+1)".

Processing Module 13:

the processing module 13 is mainly used for determining an actual overdrive value, which is an overdrive value required for performing an overdrive operation on the target pixel unit.

A specific scheme for determining the actual overdrive value by the processing module 13 is described below:

As shown in FIG. 2, the processing module 13 includes a first processing unit 131 and a second processing unit 132. The first processing unit 131 determines a target overdrive value required for the target pixel unit at the target refresh frequency according to the basic overdrive value and the overdrive gain value. A second processing unit 132 is used for determining an actual overdrive value according to the target overdrive value, the first gray scale value and the second gray scale value.

The first processing module 131 is primarily used for correcting the basic overdrive value using the overdrive gain value to obtain a target overdrive value suitable for the target refresh frequency.

Specifically, the first processing unit 131 specifically determines the product of the basic overdrive value and the overdrive gain value as the target overdrive value. The determination process of the target overdrive value may be expressed by the following formula:

delta_OD=ODgain×base_OD

Wherein delta_OD represents a target overdrive value of a target pixel unit; ODgain represents an overdrive gain value of a target refresh frequency; base_OD represents the base overdrive value of the target pixel cell.

After the first processing unit 131 determines the target overdrive value, the second processing unit 132 determines the actual overdrive value according to the target overdrive value, the first gray scale value, and the second gray scale value. The specific process of the second processing unit 132 determining the actual overdrive value is: a second processing unit 132 for determining the sum of the first gray scale value and the target overdrive value as the actual overdrive value when the first gray scale value is greater than the second gray scale value; when the first gray scale value is less than the second gray scale value, a difference value between the first gray scale value and the target overdrive value is determined as the actual overdrive value; the first gray scale value is determined as the actual overdrive value when the first gray scale value is equal to the second gray scale value.

When the first gray scale value is greater than the second gray scale value, it is indicated that the display gray scale value of the current frame of the target pixel unit is greater than the display gray scale value of the previous frame, and then the sum of the first gray scale value and the target overdrive value is determined as the actual overdrive value. When the first gray scale value is less than the second gray scale value, it indicates that the display gray scale value of the current frame of the target pixel unit is less than the display gray scale value of the previous frame, and the difference value between the first gray scale value and the target overdrive value is determined as the actual overdrive value. When the first gray scale value is equal to the second gray scale value, it is indicated that the display gray scale value of the current frame of the target pixel unit is equal to the display gray scale value of the previous frame, and then the first gray scale value is determined as the actual overdrive value.

The above scheme for determining the actual overdrive value can be summarized as follows:

$$\text{actual\_OD} = \begin{cases} g1 + \text{delta\_OD}, & g0 < g1 \\ g1 - \text{delta\_OD}, & g0 > g1 \\ g1, & g0 = g1 \end{cases}$$

actual_OD represents an actual overdrive value; delta_OD represents target overdrive value of a target pixel unit; g0 represents a second grayscale value; g1 represents the first grayscale value.

The actual overdrive value is positively related to the magnitude of the overdrive voltage, and therefore after determining the actual overdrive value, a corresponding overdrive voltage can be determined, and the voltage applied to the liquid crystal molecules corresponding to the pixel unit is changed according to the overdrive voltage, to accelerate the rotation of the liquid crystal molecules and reduce the appearance of blurred contours or smears in the display apparatus.

An overdrive device according to an embodiment of the present application, firstly, a basic overdrive value of a target pixel unit is determined according to a basic overdrive lookup table and a first gray scale value and a second gray scale value of the target pixel unit when an overdrive operation of the target pixel unit is required. Then the current refresh frequency of the display apparatus where the target pixel unit is located is taken as the target refresh frequency, and the second determination module determines an overdrive gain value corresponding to the target refresh frequency. Finally, the processing module processes the basic overdrive value, the overdrive gain value, the first gray scale value and the second gray scale value to obtain the actual overdrive value required for the overdrive operation on the target pixel unit. It can be seen that when performing overdrive, the solution provided in an embodiment of the present application only needs a set of basic overdrive lookup tables to be completed, and therefore the storage space occupied by the overdrive lookup table can be reduced, so that the size of the memory storing the overdrive lookup table can be reduced, and then the chip area for deploying the memory can be reduced, the chip manufacturing cost can be reduced, and the market competitiveness of the chip can be improved. In addition, after determining the basic overdrive value, it is corrected using the overdrive gain value corresponding to the current refresh frequency, thereby determining an overdrive value more suitable for the current refresh frequency. Therefore, the embodiments of the present application can determine an overdrive value more suitable for the current refresh frequency while reducing the storage space occupied by an overdrive lookup table required for overdrive, thereby improving the display quality of a display apparatus.

Further, the base overdrive table used by the overdrive means is an overdrive lookup table corresponding to the first refresh frequency. The basic overdrive lookup table is an overdrive lookup table scaled at a first refresh frequency. The specific value of the first refresh frequency may be determined according to service requirements, and the present embodiment is not particularly limited. Illustratively, a first refresh frequency is any one of a range of values [FL, FH], wherein FL represents the lowest refresh frequency of the display apparatus and FH represents the highest refresh frequency of the display apparatus. For example, the first refresh frequency selects the lowest refresh frequency FL.

It should be noted that no matter what numerical value is selected for the first refresh frequency, the set basic overdrive lookup table is applicable to all the refresh frequencies, that is, no matter what value the current refresh frequency of the display apparatus where the target pixel unit is located, the basic overdrive value is determined for the target pixel unit according to the basic overdrive lookup table.

The following basic overdrive lookup table is set in the following manner, and the setting manner includes the following steps 201 to 203:

Step 201, setting a first refresh frequency and a plurality of gray scale value sets, wherein a gray scale value set is composed of a third gray scale value and a fourth gray scale value.

In practical applications, the more data in the basic overdrive lookup table, the more storage space used for storing the basic overdrive lookup table, and the more area of the static random-access memory will be increased; therefore, in order to reduce the data volume in the basic overdrive lookup table, the gray scale value range [0, 255] is equally divided into N+1 segments by N grey scale thresholds, the N grey scale thresholds are determined as gray scale values, and a plurality of gray scale value sets are set according to the determined N gray scale values, wherein each gray scale value set includes two gray scale values, wherein one gray scale value serves as a third gray scale value and the other gray scale value serves as a fourth gray scale value. The N sizes may be determined according to traffic requirements, illustratively, the N is 16 or 32.

Step 202, taking the first refresh frequency as a current refresh frequency, and determining an overdrive value corresponding to each gray scale value set at the current refresh frequency on the basis of the current refresh frequency and a third gray scale value and a fourth gray scale value included in each gray scale value set.

After setting the first refresh frequency and the gray scale value set, taking the first refresh frequency as a current refresh frequency, and determining an overdrive value corresponding to each gray scale value set at the current refresh frequency according to the current refresh frequency and a third gray scale value and a fourth gray scale value included in each gray scale value set. Specifically, for each gray scale value set: controlling a display apparatus to change from displaying a first frame to displaying a second frame at a current refresh frequency, and acquiring an overdrive value corresponding to the frame change; determining the acquired overdrive value as an overdrive value corresponding to a gray scale value set; wherein the first frame is a frame corresponding to a fourth gray scale value, and the second frame is a frame corresponding to a third gray scale value.

When controlling the display apparatus to change from displaying the first frame to displaying the second frame at the current refresh frequency, an overdrive value corresponding to the frame change can be measured by means of an Asteria photometer measurement, and the obtained overdrive value is also a display gray scale value. After obtaining the overdrive value corresponding to the gray scale value set, the obtained overdrive value is determined as the overdrive value corresponding to the gray scale value set.

Step 203, setting a basic overdrive lookup table according to the overdrive values corresponding to each gray scale value set.

After the overdrive values for all gray scale value sets are determined, for each gray scale value set: establishing a corresponding relationship between a third gray scale value and a fourth gray scale value included in the gray scale value set, and an overdrive value corresponding to the gray scale value set. After the above-mentioned corresponding relationships of all gray scale value sets are established, a basic overdrive lookup table as shown in Table-1 can be obtained.

Further, the gain value lookup table used by the overdrive means is a set of data for determining an overdrive gain value pre-stored in the storage module. A corresponding relationship between a refresh frequency and a gain value recorded in a gain value lookup table. The gain value lookup table is set as follows, and the setting method includes the following steps 301 to 303:

Step 301, determining a plurality of overdrive lookup tables, wherein each overdrive lookup table has its own corresponding second refresh frequency.

A specific scheme for determining a plurality of overdrive lookup tables is described below. The method of determining a plurality of multi-drive lookup tables includes the steps of: setting a plurality of second refresh frequencies and a plurality of gray scale value sets corresponding to each second refresh frequency, wherein a gray scale value set is composed of a third gray scale value and a fourth gray scale value. The plurality of second refresh frequencies are traversed, and the current traversed second refresh frequency is taken as a current refresh frequency, and an overdrive value corresponding to each gray scale value set at the current refresh frequency is determined according to the current refresh frequency and a third gray scale value and a fourth gray scale value included in each gray scale value set. For each second refresh frequency, an overdrive lookup table corresponding to the second refresh frequency is set according to an overdrive value corresponding to each gray scale value set at the second refresh frequency.

The principle of setting the second refresh frequency may be: the display apparatus refresh frequency range [FL, FH] is divided into M+1 segments by M frequency threshold values, wherein the value range of M is [2, 32], the greater M is, the higher accuracy is, and at the same time, the more refresh frequencies and corresponding gain values need to be stored. The M frequency threshold values are correspondingly determined as M second refresh frequencies.

After the second refresh frequencies are determined, a set of gray scale values needs to be determined for each of the second refresh frequencies. The method of determining the set of gray scale values is substantially the same as the method of determining the set of gray scale values corresponding to the first refresh frequency described above, and therefore will not be described in detail herein.

After setting the second refresh frequency and the plurality of sets of gray scale values corresponding to each second refresh frequency, an overdrive lookup table corresponding to each refresh frequency will be determined. Specifically, for each gray scale value set: controlling a display apparatus to change from displaying a first frame to displaying a second frame at a current refresh frequency, and acquiring an overdrive value corresponding to the frame change; determining the acquired overdrive value as an overdrive value corresponding to a gray scale value set; wherein the first frame is a frame corresponding to a fourth gray scale value, and the second frame is a frame corresponding to a third gray scale value.

When controlling the display apparatus to change from displaying the first frame to displaying the second frame at the current refresh frequency, an overdrive value corresponding to the frame change can be measured by means of an Asteria photometer measurement, and the obtained overdrive value is also a display gray scale value. After obtaining the overdrive value corresponding to the gray scale value set, the obtained overdrive value is determined as the overdrive value corresponding to the gray scale value set.

After the overdrive values of all gray scale value sets are determined, for each second refresh frequency: establishing a corresponding relationship between a third gray scale value and a fourth gray scale value included in the gray scale value set, and an overdrive value corresponding to the gray scale value set. After the above-mentioned corresponding relationships of all gray scale value sets are established, an overdrive lookup table of a second refresh frequency can be obtained.

Step 302, for each of the second refresh frequencies: calculating an average value of overdrive values included in an overdrive lookup table corresponding to the second refresh frequency; determining a ratio between the calculated average value and the average value of the overdrive values included in the basic overdrive lookup table as a gain value corresponding to the second refresh frequency After obtaining an overdrive lookup table corresponding to each second refresh frequency, a gain value corresponding to the second refresh frequency is determined for each second refresh frequency by the following formula.

$$\text{gain}(i) = \frac{d_i\_\text{mean}}{d\_\text{mean}}$$

gain (i) represents a gain value corresponding to the $i^{th}$ second refresh frequency, i=0~(M-1); d_mean represents an average value of overdrive values included in the basic overdrive lookup table; the di_mean represents an average of overdrive values included in the overdrive lookup table corresponding to the second refresh frequency.

Wherein the determination scheme of the average value of the overdrive values included in the basic overdrive lookup table as shown in Table-1 is calculated by the following formula.

$$d\_mean = \frac{\sum_{n=0}^{N}\sum_{n=0}^{N} d\_nn}{(N+1)*(N+1)}$$

d_nn represents an overdrive value corresponding to an $n^{th}$ row and an $n^{th}$ column; one N in the denominator represents the total number of rows and the other N represents the total number of columns.

Step 303, setting the gain value lookup table according to the gain value corresponding to each of the second refresh frequencies.

After determining the gain values corresponding to all refresh frequencies, for each second refresh frequency, a correspondence between the second refresh frequency and its corresponding gain value is established. Finally, a gain value lookup table as shown in Table-2 is obtained. The relationship between each refresh frequency and its respective corresponding gain value in Table-2 can be represented by FIG. 3.

Further, it is to be noted that the display data of the target pixel unit is generally composed of data of RGB three channels, and therefore there are two schemes for setting the basic overdrive lookup table and the gain value lookup table: according to one scheme, only one basic overdrive lookup table and gain value lookup table are set, and for each channel in the RGB three channels, the same basic overdrive lookup table and gain value lookup table are used to determine the actual overdrive value. According to another scheme, a basic overdrive lookup table and a gain value lookup table respectively corresponding to each of the RGB three channels is set, i.e., when the actual overdrive value of one channel of the RGB three channels needs to be determined, the corresponding basic overdrive lookup table and gain value lookup table are used.

Illustratively, only one basic overdrive lookup table and gain value lookup table is provided. The image data (R, G, B) of the previous frame of the target pixel unit is (50, 50, 192), and the image data (R, G, B) of the current frame is (100, 150, 64). When an overdrive operation is performed for the R channel, a first gray scale value of 100 and a second gray scale value of 50 are used.

When an overdrive operation is performed for the G channel, a first gray scale value of 150 and a second gray scale value of 50 are used. For overdrive operation on channel B, a first gray scale value of 64 and a second gray scale value of 192 are used. The first gray scale value and the second gray scale value used for the above-mentioned three-channel overdrive operation are different, but since only one basic overdrive lookup table and gain value lookup table are provided, the same basic overdrive lookup table and gain value lookup table are used.

It should be noted that the modules and units described above maybe implemented by any one of hardware, firmware or software, or a combination thereof. For example, the modules and units can all be implemented by hardware, for example implemented by circuit. Or, in some embodiments, all the modules and units can be implemented by software as program modules or set of instructions. Therefore, the apparatus as a whole may be implemented as programs stored in a non-transitory memory. Or, in some embodiments, according to application scenarios, parts of the modules and units can be implemented by software and parts of the modules and units can be implemented by hardware or firmware. In that case, the apparatus as a whole may be implemented as a device with hardware (circuit) and storage medium.

Further, according to the above-mentioned overdrive device embodiment, another embodiment of the present application also provides an overdrive method, as shown in FIG. 4, including the steps of:

Step 401, determining a basic overdrive value of a target pixel unit according to a basic overdrive lookup table and a first gray scale value and a second gray scale value of the target pixel unit, wherein the basic overdrive lookup table is a set of data pre-stored in a storage module for determining the basic overdrive value, the first gray scale value is a display gray scale value of a current frame of the target pixel unit, and the second gray scale value is a display gray scale value of a previous frame of the target pixel unit;

Step 402, determining an overdrive gain value corresponding to a target refresh frequency, wherein the target refresh frequency is a current refresh frequency of a display apparatus where a target pixel unit is located; and

403, obtaining an actual overdrive value required for performing an overdrive operation on the target pixel unit according to the basic overdrive value, the overdrive gain value, the first gray scale value and the second gray scale value.

An overdrive method according to an embodiment of the present application firstly determines a basic overdrive value of a target pixel unit according to a basic overdrive lookup table, a first gray scale value and a second gray scale value of the target pixel unit when an overdrive operation on the target pixel unit is required. Then the current refresh frequency of the display apparatus where the target pixel unit is located is taken as the target refresh frequency, and an overdrive gain value corresponding to the target refresh frequency is determined. Finally, an actual overdrive value required for performing an overdrive operation on the target pixel unit is obtained according to the basic overdrive value, the overdrive gain value, the first gray scale value and the second gray scale value. It can be seen that when performing overdrive, the solution provided in an embodiment of the present application only needs a set of basic overdrive lookup tables to be completed, and therefore the storage space occupied by the overdrive lookup table can be reduced, so that the size of the memory storing the overdrive lookup table can be reduced, and then the chip area for deploying the memory can be reduced, the chip manufacturing cost can be reduced, and the market competitiveness of the chip can be improved. In addition, after determining the basic overdrive value, it is corrected using the overdrive gain value corresponding to the current refresh frequency, thereby determining an overdrive value more suitable for the current refresh frequency.

Therefore, the embodiments of the present application can determine an overdrive value more suitable for the current refresh frequency while reducing the storage space occupied by an overdrive lookup table required for overdrive, thereby improving the display quality of a display apparatus.

Optionally, the specific execution process of the above-mentioned step 401 for determining the basic overdrive value of the target pixel unit according to the basic overdrive lookup table and the first gray scale value and the second gray scale value of the target pixel unit includes the following two cases:

firstly, in the case where an overdrive value corresponding to the first gray scale value and the second gray scale value in the basic overdrive lookup table is determined as the basic overdrive value in the case where a third gray scale value corresponding to the first gray scale value and a fourth gray scale value corresponding to the second gray scale value exist in the basic overdrive lookup table; wherein the basic overdrive lookup table includes a plurality of overdrive values, and each overdrive value has a third gray scale value and a fourth gray scale value respectively corresponding thereto.

Secondly, when at least one of the following is present: no third gray scale value exists in the basic overdrive lookup table which is the same as the first gray scale value, and no fourth gray scale value exists in the basic overdrive lookup table which is the same as the second gray scale value; selecting two third gray scale values adjacent to the numerical value and two fourth gray scale values adjacent to the numerical value in the basic overdrive lookup table; determining four overdrive values according to the selected two third gray scale values and the selected two fourth gray scale values, and performing bilinear interpolation processing on the determined four overdrive values to obtain the basic overdrive value; wherein the first gray scale value is included in a numerical interval composed of the determined two third gray scale values, and the second gray scale value is included in a numerical interval composed of the determined two fourth gray scale values; the basic overdrive lookup table includes a plurality of overdrive values, and each overdrive value has a third gray scale value and a fourth gray scale value respectively corresponding thereto.

Optionally, the specific execution process of determining the overdrive gain value corresponding to the target refresh frequency in the above-mentioned step 402 includes: determining an overdrive gain value corresponding to the target refresh frequency according to a corresponding relationship between the refresh frequency and the gain value recorded in a gain value lookup table.

Optionally, there are three ways of carrying out the above-mentioned steps of determining an overdrive gain value corresponding to the target refresh frequency on the basis of the corresponding relationship between the refresh frequency and the gain value recorded in the gain value lookup table:

firstly, a gain value corresponding to the target refresh frequency in the gain value lookup table is determined as an overdrive gain value of the target refresh frequency in the case where a refresh frequency corresponding to the target refresh frequency exists in the gain value lookup table;

secondly, two refresh frequencies adjacent to a numerical value in the gain value lookup table are selected in the case where no refresh frequency corresponding to the target refresh frequency exists in the gain value lookup table, and the target refresh frequency is included in a refresh frequency range defined by the gain value lookup table, two gain values are determined according to the selected two refresh frequencies, and linear interpolation processing is performed on the determined two gain values to obtain an overdrive gain value of the target refresh frequency; wherein the target refresh frequency is included in a numerical interval composed of two adjacent refresh frequencies; and thirdly, a gain value corresponding to the minimum refresh frequency in the gain value lookup table is determined as an overdrive gain value of the target refresh frequency in the case where the target refresh frequency is less than the minimum refresh frequency in the gain value lookup table; and in the case where the target refresh frequency is greater than a maximum refresh frequency in the gain value lookup table, a gain value corresponding to the maximum refresh frequency in the gain value lookup table is determined as an overdrive gain value of the target refresh frequency.

Optionally, the above-mentioned specific execution process of step 403 of obtaining an actual overdrive value required for performing an overdrive operation on the target pixel unit according to the basic overdrive value, the overdrive gain value, the first gray scale value and the second gray scale value includes the following steps 4031 to 4032:

Step 4031, determining a target overdrive value required by the target pixel unit at the target refresh frequency according to the basic overdrive value and the overdrive gain value; and Step 4032, a second processing unit for determining the actual overdrive value according to the target overdrive value, the first gray scale value and the second gray scale value.

Optionally, the above-mentioned specific execution process of step 4031 of determining a target overdrive value required by the target pixel unit at the target refresh frequency according to the basic overdrive value and the overdrive gain value includes: determining a product of the basic overdrive value and the overdrive gain value as the target overdrive value.

Optionally, the above-mentioned step 4032 of determining a specific execution process of the actual overdrive value according to the target overdrive value, the first gray level value, and the second gray level value includes: determining the sum of the first gray scale value and the target overdrive value as the actual overdrive value when the first gray scale value is greater than the second gray scale value; when the first gray scale value is less than the second gray scale value, a difference value between the first gray scale value and the target overdrive value is determined as the actual overdrive value; the first gray scale value is determined as the actual overdrive value when the first gray scale value is equal to the second gray scale value.

Alternatively, the basic overdrive lookup table involved in the overdrive method is set as follows:

setting a first refresh frequency and a plurality of gray scale value sets, wherein a gray scale value set is composed of a third gray scale value and a fourth gray scale value;

determining an overdrive value corresponding to each gray scale value set at the first refresh frequency according to the first refresh frequency and a third gray scale value and a fourth gray scale value included by each gray scale value set; and setting the basic overdrive lookup table according to an overdrive value corresponding to each of the gray scale value sets.

Optionally, the gain value lookup table involved in the overdrive method is set as follows: determining a plurality of overdrive lookup tables, wherein each overdrive lookup table has its own corresponding second refresh frequency;

for each of the second refresh frequencies: calculating an average value of overdrive values included in an overdrive lookup table corresponding to the second refresh frequency; determining a ratio between the calculated average value and the average value of the overdrive values included in the basic overdrive lookup table as a gain value corresponding to the second refresh frequency; and setting the gain value lookup table according to the gain value corresponding to each of the second refresh frequencies.

Details of the steps in the overdrive method according to the embodiments of the present application can be found in the corresponding details of the embodiments of the overdrive device described above and will not be described in detail herein.

Further, according to the above-mentioned embodiments, another embodiment of the present application also provides a controller including a processor and a machine-readable storage medium storing machine-executable instructions capable of being executed by the processor, and the instructions are loaded and executed by the processor to realize the above-mentioned overdrive method.

Advantageous effects of the controller according to the embodiments of the present application can be seen from the advantageous effects of the above-mentioned overdrive method.

Further, according to the above-mentioned embodiment, another embodiment of the present application also provides a display apparatus including the above-mentioned overdrive device.

Advantageous effects of the display apparatus according to the embodiments of the present application can be seen from the above-mentioned advantageous effects of the overdrive device.

In the above-mentioned embodiments, the description of each embodiment has its own emphasis, and reference can be made to the description of described in detail can be referred to the description of other embodiments.

It will be understood that relative features of the methods and devices described above may be referred to one another. In addition, the terms "first", "second", and the like in the above-mentioned embodiments are used to distinguish the various embodiments and do not represent the advantages or disadvantages of the various embodiments.

It will be clear to a person skilled in the art that, for the convenience and brevity of the description, specific working procedures of the above-described systems, devices and units may be referred to corresponding procedures in the preceding method embodiments and will not be described in detail here.

The algorithms and displays presented herein are not inherently related to any particular computer, virtual system, or other apparatus. Various general-purpose systems may also be used with the teachings based herein. The structure required to construct such a system is apparent from the above description. Further, this application is not directed to any particular programming language. The subject matter described herein may be implemented using a variety of programming languages and that the description above of specific languages is for the purpose of disclosing the best mode of practicing the subject matter.

In the description provided herein, numerous specific details are set forth. However, it is understood that embodiments of the present application may be practiced without these specific details. In some instances, well-known methods, structures, and techniques have not been shown in detail in order not to obscure the understanding of this description.

Moreover, a person skilled in the art will appreciate that although some embodiments described herein include some but not other features included in other embodiments, combinations of features of different embodiments are meant to be within the scope of the application and form different embodiments. For example, in the following claims, any one of the claimed embodiments may be used in any combination.

Various component embodiments of the present application may be implemented in hardware, or in a software module running on one or more processors, or in a combination thereof. A person skilled in the art will appreciate that a microprocessor or DSP (digital signal processor) may be used in practice to implement some or all the functions of some or all the components of the overdrive method according to the embodiments of the present application. The application can also be implemented as an apparatus or device program (e.g., a computer program and a computer program product) for performing some or all the methods described herein. Such a program implementing the present application may be stored on a computer-readable medium, or may be in the form of one or more signals. Such signals may be downloaded from an Internet website, provided on a carrier signal, or provided in any other form.

It should be noted that the above-mentioned embodiments illustrate rather than limit the application, and that a person skilled in the art will be able to design alternative embodiments without departing from the scope of the appended claims. In the claims, any reference signs placed between parentheses shall not be construed as limiting the claim. The word "including" does not exclude the presence of elements or steps other than those listed in a claim. The word "a" or "an" preceding an element does not exclude the presence of a plurality of such elements. The application can be implemented by means of hardware including several distinct elements, and by means of a suitably programmed computer. In the unit claims enumerating several devices, several of these devices can be embodied by one and the same item of hardware. The use of the words first, second, third, etc. does not denote any order. These words may be interpreted as names.

The invention claimed is:

1. An overdrive device, comprising:
a first determination module for determining a basic overdrive value of a target pixel unit according to a basic overdrive lookup table and a first gray scale value and a second gray scale value of the target pixel unit, wherein the basic overdrive lookup table is a set of data pre-stored in a storage module for determining the basic overdrive value, the first gray scale value is a display gray scale value of a current frame of the target pixel unit, and the second gray scale value is a display gray scale value of a previous frame of the target pixel unit, regardless of the value of the current refresh frequency of the display apparatus in which the target pixel unit is located, a basic overdrive value may be determined for the target pixel unit through the basic overdrive lookup table, and the image data of the target pixel unit is composed of data of RGB three channels, and the display gray scale value of the current frame and the display gray scale value of the previous frame of the target pixel unit are related to the currently selected channel; in the case of the R channel is overdriven, the display gray scale value of the current frame of the target pixel unit comprises a display gray scale value corresponding to the R channel of the current frame, and the display gray scale value of the previous frame of the target pixel unit comprises a gray scale value corresponding to the R channel of the previous frame; in the case of the G channel is overdriven, the display gray scale value of the current frame of the target pixel unit comprises a display gray scale value corresponding to the G channel of the current frame, and the display gray scale value of the previous frame of the target pixel unit comprises a gray scale value corresponding to the G channel of the previous frame; in the case of the B channel is overdriven, the display gray scale value of the current frame of the target pixel unit comprises the display gray scale value corresponding to the B channel of the current frame, and the display gray scale value of the previous frame of the target pixel unit comprises a gray scale value corresponding to the B channel of the previous frame;

a second determination module for determining an overdrive gain value corresponding to a target refresh frequency, wherein the target refresh frequency is a current refresh frequency of a display apparatus where a target pixel unit is located, the overdrive gain value is used to correct the basic overdrive value; and a processing module for determining a product of the basic overdrive value and the overdrive gain value as a target overdrive value required for the target pixel unit at the target refresh frequency, and obtaining an actual overdrive value required for performing an overdrive operation on the target pixel unit according to the target overdrive value, the first gray scale value, and the second gray scale value;

the second determination module is specifically used for determining an overdrive gain value corresponding to the target refresh frequency based on a corresponding relationship between the second refresh frequency and the gain value recorded in a gain value lookup table; wherein the number of the basic overdrive lookup table is one and the number of the gain value lookup table is one, and the same basic overdrive lookup table and gain value lookup table are used to determine an actual overdrive value for each channel in the RGB three channels of image data of the target pixel unit; or respectively setting a basic overdrive lookup table and a gain value lookup table respectively corresponding thereto for the RGB three channels, and respectively using a corresponding basic overdrive lookup table and a gain value lookup table to determine an actual overdrive value for each channel in the RGB three channels of image data of the target pixel unit;

the gain value lookup table involved in the overdrive method is set as follows:

dividing the display apparatus refresh frequency range [FL, FH] into M+1 segments via M frequency threshold values, determining the M frequency threshold values as a second refresh frequency in a gain value lookup table, wherein FL represents the lowest refresh frequency of the display apparatus, and FH represents the highest refresh frequency of the display apparatus;

determining a plurality of overdrive lookup tables, wherein each overdrive lookup table has its own corresponding second refresh frequency;

for each of the second refresh frequencies: calculating an average value of overdrive values comprised in an overdrive lookup table corresponding to the second refresh frequency;

determining a ratio between the calculated average value and the average value of the overdrive values comprised in the basic overdrive lookup table as a gain value corresponding to the second refresh frequency; and setting the gain value lookup table according to the gain value corresponding to each of the second refresh frequencies;

the specific process of determining by the second determination module an overdrive gain value corresponding to a target refresh frequency comprises:

when the target refresh frequency is less than the minimum refresh frequency in the gain value lookup table, determining a gain value corresponding to the minimum refresh frequency in the gain value lookup table as an overdrive gain value of the target refresh frequency;

when the target refresh frequency is greater than or equal to the maximum refresh frequency in the gain value lookup table, determining a gain value corresponding to the maximum refresh frequency in the gain value lookup table as an overdrive gain value of the target refresh frequency; and when the target refresh frequency is greater than or equal to the minimum refresh frequency in the gain value lookup table, and is less than the maximum refresh frequency in the gain value lookup table, performing the following steps: selecting two refresh frequencies adjacent to a numerical value from a gain value lookup table, wherein the target refresh frequency is comprised between the two refresh frequencies; determining a first difference value between a refresh frequency with a large numerical value in the two refresh frequencies and the target refresh frequency, and determining a second difference value between the target refresh frequency and a refresh frequency with a small numerical value in the two refresh frequencies; determining a first product between a first difference value and a gain value corresponding to a refresh frequency with a small numerical value in the two refresh frequencies, determining a second product between a second difference value and a gain value corresponding to a refresh frequency with a large numerical value in the two refresh frequencies, and determining a sum of the first product and the second product; determining a third difference value between a numerical large refresh frequency and a numerical small refresh frequency of the two refresh frequencies; and determining a ratio between the sum and the third difference as an overdrive gain value of the target refresh frequency.

2. The device according to claim 1, wherein the second processing module is specifically used for determining the sum of the first gray scale value and the target overdrive value as the actual overdrive value when the first gray scale value is greater than the second gray scale value; when the first gray scale value is less than the second gray scale value, a difference value between the first gray scale value and the target overdrive value is determined as the actual overdrive value; the first gray scale value is determined as the actual overdrive value when the first gray scale value is equal to the second gray scale value.

3. The device according to claim 1, wherein the basic overdrive lookup table is set by:

setting a first refresh frequency and a plurality of gray scale value sets, wherein a gray scale value set is composed of a third gray scale value and a fourth gray scale value;

determining an overdrive value corresponding to each gray scale value set at the first refresh frequency according to the first refresh frequency and a third gray scale value and a fourth gray scale value comprised by each gray scale value set; and setting the basic overdrive lookup table according to an overdrive value corresponding to each of the gray scale value sets.

4. The device according to claim 1, wherein the first determination module comprises:
- a first determination unit for determining an overdrive value corresponding to the first gray scale value and the second gray scale value in the basic overdrive lookup table as the basic overdrive value in the case where a third gray scale value corresponding to the first gray scale value and a fourth gray scale value corresponding to the second gray scale value exist in the basic overdrive lookup table; wherein the basic overdrive lookup table comprises a plurality of overdrive values, and each overdrive value has a third gray scale value and a fourth gray scale value respectively corresponding thereto.

5. The device according to claim 1, wherein the first determination module comprises:
- a second determination unit for:
- when at least one of the following is present: no third gray scale value exists in the basic overdrive lookup table which is the same as the first gray scale value, and no fourth gray scale value exists in the basic overdrive lookup table which is the same as the second gray scale value;
- selecting two third gray scale values adjacent to the numerical value and two fourth gray scale values adjacent to the numerical value in the basic overdrive lookup table; determining four overdrive values according to the selected two third gray scale values and the selected two fourth gray scale values, and performing bilinear interpolation processing on the determined four overdrive values to obtain the basic overdrive value; wherein the first gray scale value is comprised in a numerical interval composed of the determined two third gray scale values, and the second gray scale value is comprised in a numerical interval composed of the determined two fourth gray scale values; the basic overdrive lookup table comprises a plurality of overdrive values, and each overdrive value has a third gray scale value and a fourth gray scale value respectively corresponding thereto.

6. The device according to claim 1, wherein the second determination module comprises:
- a third determination unit for determining a gain value corresponding to the target refresh frequency in the gain value lookup table as an overdrive gain value of the target refresh frequency in the case where a refresh frequency corresponding to the target refresh frequency exists in the gain value lookup table.

7. The device according to claim 1, wherein the second determination module comprises:
- a third determination unit for determining a gain value corresponding to the target refresh frequency in the gain value lookup table as an overdrive gain value of the target refresh frequency in the case where a refresh frequency corresponding to the target refresh frequency exists in the gain value lookup table.

8. The device according to claim 1, wherein the second determination module comprises:
- a fourth determination unit for selecting two refresh frequencies adjacent to a numerical value in the gain value lookup table in the case where no refresh frequency corresponding to the target refresh frequency exists in the gain value lookup table, and the target refresh frequency is comprised in a refresh frequency range defined by the gain value lookup table, determining two gain values according to the selected two refresh frequencies, and performing linear interpolation processing on the determined two gain values to obtain an overdrive gain value of the target refresh frequency; wherein the target refresh frequency is comprised in a numerical interval composed of two adjacent refresh frequencies.

9. The device according to claim 1, wherein the second determination module comprises:
- a fourth determination unit for selecting two refresh frequencies adjacent to a numerical value in the gain value lookup table in the case where no refresh frequency corresponding to the target refresh frequency exists in the gain value lookup table, and the target refresh frequency is comprised in a refresh frequency range defined by the gain value lookup table, determining two gain values according to the selected two refresh frequencies, and performing linear interpolation processing on the determined two gain values to obtain an overdrive gain value of the target refresh frequency; wherein the target refresh frequency is comprised in a numerical interval composed of two adjacent refresh frequencies.

10. A controller, comprising a processor and a machine-readable storage medium storing machine-executable instructions capable of being executed by the processor, the instructions being loaded and executed by the processor to achieve the overdrive method according to claim 9.

11. The device according to claim 1, wherein the second determination module comprises:
- a fifth determination unit for determining a gain value corresponding to the minimum refresh frequency in the gain value lookup table as an overdrive gain value of the target refresh frequency in the case where the target refresh frequency is less than the minimum refresh frequency in the gain value lookup table; and in the case where the target refresh frequency is greater than a maximum refresh frequency in the gain value lookup table, determining a gain value corresponding to the maximum refresh frequency in the gain value lookup table as an overdrive gain value of the target refresh frequency.

12. The device according to claim 1, wherein the second determination module comprises:
- a fifth determination unit for determining a gain value corresponding to the minimum refresh frequency in the gain value lookup table as an overdrive gain value of the target refresh frequency in the case where the target refresh frequency is less than the minimum refresh frequency in the gain value lookup table; and in the case where the target refresh frequency is greater than a maximum refresh frequency in the gain value lookup table, determining a gain value corresponding to the maximum refresh frequency in the gain value lookup table as an overdrive gain value of the target refresh frequency.

13. An overdrive method, wherein the method comprises:
- determining a basic overdrive value of a target pixel unit according to a basic overdrive lookup table and a first gray scale value and a second gray scale value of the target pixel unit, wherein the basic overdrive lookup table is a set of data pre-stored in a storage module for determining the basic overdrive value, the first gray scale value is a display gray scale value of a current frame of the target pixel unit, and the second gray scale value is a display gray scale value of a previous frame of the target pixel unit, regardless of the value of the current refresh frequency of the display apparatus in which the target pixel unit is located, a basic overdrive value may be determined for the target pixel unit through the basic overdrive lookup table; the image data of the target pixel unit is composed of data of RGB three channels, and the display gray scale value of the current frame and the display gray scale value of the previous frame of the target pixel unit are related to the currently selected channel; in the case of the R channel is overdriven, the display gray scale value of the current frame of the target pixel unit comprises a display gray scale value corresponding to the R channel of the current frame, and the display gray scale value of the previous frame of the target pixel unit comprises a gray scale value corresponding to the R channel of the previous frame; in the case of the G channel is overdriven, the display gray scale value of the current frame of the target pixel unit comprises a display gray scale value corresponding to the G channel of the current frame, and the display gray scale value of the previous frame of the target pixel unit comprises a gray scale value corresponding to the G channel of the previous frame; in the case of the B channel is overdriven, the display gray scale value of the current frame of the target pixel unit comprises the display gray scale value corresponding to the B channel of the current frame, and the display gray scale value of the previous frame of the target pixel unit comprises a gray scale value corresponding to the B channel of the previous frame;

determining an overdrive gain value corresponding to a target refresh frequency, wherein the target refresh frequency is a current refresh frequency of a display apparatus where a target pixel unit is located, the overdrive gain value is used to correct the basic overdrive value; and determining a product of the basic overdrive value and the overdrive gain value as a target overdrive value required for the target pixel unit at the target refresh frequency, and obtaining an actual overdrive value required for performing an overdrive operation on the target pixel unit according to the target overdrive value, the first gray scale value, and the second gray scale value;

wherein the determining an overdrive gain value corresponding to a target refresh frequency comprises determining an overdrive gain value corresponding to the target refresh frequency based on a corresponding relationship between the second refresh frequency and the gain value recorded in a gain value lookup table; wherein the number of the basic overdrive lookup table is one and the number of the gain value lookup table is one, and the same basic overdrive lookup table and gain value lookup table are used to determine an actual overdrive value for each channel in the RGB three channels of image data of the target pixel unit; or respectively setting a basic overdrive lookup table and a gain value lookup table respectively corresponding thereto for the RGB three channels, and respectively using a corresponding basic overdrive lookup table and a gain value lookup table to determine an actual overdrive value for each channel in the RGB three channels of image data of the target pixel unit;

the gain value lookup table involved in the overdrive method is set as follows:

dividing the display apparatus refresh frequency range [FL, FH] into M+1 segments via M frequency threshold values, determining the M frequency threshold values as a second refresh frequency in a gain value lookup table, wherein FL represents the lowest refresh frequency of the display apparatus, and FH represents the highest refresh frequency of the display apparatus;

determining a plurality of overdrive lookup tables, wherein each overdrive lookup table has its own corresponding second refresh frequency;

for each of the second refresh frequencies: calculating an average value of overdrive values comprised in an overdrive lookup table corresponding to the second refresh frequency;

determining a ratio between the calculated average value and the average value of the overdrive values comprised in the basic overdrive lookup table as a gain value corresponding to the second refresh frequency; and setting the gain value lookup table according to the gain value corresponding to each of the second refresh frequencies;

the determining an overdrive gain value corresponding to a target refresh frequency comprises:

when the target refresh frequency is less than the minimum refresh frequency in the gain value lookup table, determining a gain value corresponding to the minimum refresh frequency in the gain value lookup table as an overdrive gain value of the target refresh frequency;

when the target refresh frequency is greater than or equal to the maximum refresh frequency in the gain value lookup table, determining a gain value corresponding to the maximum refresh frequency in the gain value lookup table as an overdrive gain value of the target refresh frequency; and when the target refresh frequency is greater than or equal to the minimum refresh frequency in the gain value lookup table, and is less than the maximum refresh frequency in the gain value lookup table, performing the following steps: selecting two refresh frequencies adjacent to a numerical value from a gain value lookup table, wherein the target refresh frequency is comprised between the two refresh frequencies; determining a first difference value between a refresh frequency with a large numerical value in the two refresh frequencies and the target refresh frequency, and determining a second difference value between the target refresh frequency and a refresh frequency with a small numerical value in the two refresh frequencies; determining a first product between a first difference value and a gain value corresponding to a refresh frequency with a small numerical value in the two refresh frequencies, determining a second product between a second difference value and a gain value corresponding to a refresh frequency with a large numerical value in the two refresh frequencies, and determining a sum of the first product and the second product; determining a third difference value between a numerical large refresh frequency and a numerical small refresh frequency of the two refresh frequencies; and determining a ratio between the sum and the third difference as an overdrive gain value of the target refresh frequency.

* * * * *